United States Patent [19]

Bliss

[11] 3,989,406
[45] Nov. 2, 1976

[54] METHOD OF AND APPARATUS FOR PREVENTING LEADING EDGE SHOCKS AND SHOCK-RELATED NOISE IN TRANSONIC AND SUPERSONIC ROTOR BLADES AND THE LIKE

[75] Inventor: Donald B. Bliss, Belmont, Mass.

[73] Assignee: Bolt Beranek and Newman, Inc., Cambridge, Mass.

[22] Filed: Nov. 26, 1974

[21] Appl. No.: 527,499

[52] U.S. Cl. .................................. 415/1; 415/181; 416/228
[51] Int. Cl.² ...................................... F01D 5/12
[58] Field of Search ............ 415/181; 416/228, 223

[56] References Cited
UNITED STATES PATENTS

| | | | |
|---|---|---|---|
| 2,582,107 | 1/1952 | Dakin | 416/237 |
| 2,663,493 | 12/1953 | Keast | 416/222 |
| 3,721,507 | 3/1973 | Monteleone | 416/228 X |

FOREIGN PATENTS OR APPLICATIONS

| | | | |
|---|---|---|---|
| 719,523 | 10/1965 | Canada | 415/181 |
| 719,457 | 12/1954 | United Kingdom | 415/181 |

*Primary Examiner*—Arnold Rosenthal
*Attorney, Agent, or Firm*—Rines and Rines

[57] ABSTRACT

This disclosure is concerned with novel rotor blade and similar foil designs that, by critical skewing of intermediate blade regions where the airflow is supersonic, prevents leading edge shocks and shock-related noise.

11 Claims, 6 Drawing Figures

METHOD OF AND APPARATUS FOR PREVENTING LEADING EDGE SHOCKS AND SHOCK-RELATED NOISE IN TRANSONIC AND SUPERSONIC ROTOR BLADES AND THE LIKE

The present invention relates to apparatus and methods of preventing or materially reducing leading edge shocks and shock-related noise in transonic and supersonic rotor blades and similar foils (hereinafter generally referred to as "blade" and sometimes as "wing" or "foil"), being more particularly, though not exclusively, concerned with turbofans and similar jet engine structures.

Many modern aircraft use high-bypass ratio turbofan engines for propulsion, in which the first stage consists of a large multi-bladed fan rotor followed by a set of fixed stator blades and enclosed within a shroud as described, for example, in Jane's "All the World's Aircraft", 1972-73, McGraw-Hill, New York. This fan stage contributes directly to propelling the vehicle because a large portion of the thru-flow bypasses the rest of the engine and is used directly to produce thrust. For reasons of efficiency and maximum output, it is desirable to operate the fan at rotational speeds which make the velocity of the outer portion of the fan blades supersonic relative to the flow; but, unfortunately, this gives rise to a pattern of shockwaves and expansion waves produced by the flow over the blades. Waves produced at the leading edge and on part or all of the suction side of each blade can travel upstream and thus radiate from the shroud inlet to produce shock-related noise as an inherent and natural consequence of the steady-state operation of the rotor. Such noise generation differs from the usual subsonic noise sources which arise primarily from unsteady flow phenomena and which produce fluctuating loads on the blades. Of course, the production of shockrelated noise need not be specifically related to the high-bypass ratio turbofan configuration, since any axial flow turbojet engine or the like having rotor blades which operate at supersonic velocity, relative to the flow over part or all of their blade span, will generate this form of shock-related noise.

The noise caused by shockwaves propagating upstream from the rotor blades is often called combination tone or multiple pure tone (MPT) noise. This form of noise is usually manifested by a series of tones at the blade passage frequency and the shaft rotation frequency and at their harmonics. The tones at the shaft frequency and harmonics arise from blade-to-blade differences due to manufacturing tolerances. Since perturbations owing to blade-to-blade dissimilarities are considerably exaggerated due to a natural instability of the propagating shock wave-train, each fan has its own characteristic MPT noise signature.

MPT noise is not easily reduced by conventional sound treatment procedures; e.g. absorptive lining on the shroud inlet duct as described, for example, in U.S. Pat. Nos. 3,113,634 and 2,759,554-5 and 6. While the strength of the shock field does decay to some extent due to nonlinear attenuation as the waves propagate up the duct, simplified analytical models for this process have shown that the strength of the waves far upstream is quite insensitive to small changes in the initial strength. This suggests that effective reduction of this noise source can be achieved only if the upstream shocks are either eliminated or if their strength is substantially reduced at their source.

The conventional approach to reducing upstream shock strength is based on an essentially two-dimensional idea, as described, for example, by A. Ferri, 1964, "The Supersonic Compressor II — Aerodynamic Properties of Supersonic Compressors", Aerodynamics of Turbines and Compressors, W. R. Hawthorne (ed.); Princeton University Press, pp. 381-397; and by A. W. Goldstein et al, 1973, "Acoustic Properties of a Supersonic Fan", NASA TN d-7096. At each blade cross-section along the supersonic portion of the span, the leading edge and part of suction surface of the blade section are specifically shaped to prevent the formation of waves which could propagate upstream. Typically, there is a sharp leading edge followed by a flat portion of the suction surface designed to be tangent to the relative inflow. In reality, however, there will still be an upstream wave system due to the inevitable non-zero thickness of the leading edges and the presence of a viscous boundary layer; but despite these effects, it is possible to achieve a net reduction in the strength of upstream waves.

While this approach is valid in principle, it has serious shortcomings in practice. Since precise alignment of the blade with the relative inflow is necessary, proper operation occurs only at optimum design conditions. When the fan is called upon to operate under non-optimum design conditions, much of the noise reduction advantage is lost. Such non-optimum design operation is a common occurrence; it is particularly necessary during take-off and landing when, unfortunately, noise reduction is most needed. Furthermore, even for optimum -design operation, it is difficult to know the precise inflow angle over the entire supersonic portion of the blade. The flow phenomena through a rotor are naturally three-dimensional and these three-dimensional effects are especially difficult to predict when the blades have a transonic flow region; i.e. a region where the transition from subsonic to supersonic relative inflow occurs. The presence of a subsonic region near the hub allows pressure signals from downstream of the rotor to travel upstream and distort the supersonic portion of the inflow velocity relative to the blade, such distortion being most pronounced in the transonic and lower supersonic region and being very difficult to predict accurately. Besides this natural inflow distortion effect, additional inflow distortions may also occur at the shroud inlet, caused, for example, by the upwash field of the wing and/or an angle of attack of the shroud under certain flight conditions. Since such distortion may not be axially symmetric, there is no way the blades can be designed to compensate therefor. Finally, because of the critical alignment, very accurate manufacturing techniques are required to assure proper operation of this blade design concept.

From these considerations, it is apparent that a substantial reduction in the stength of upstream shockwaves, or their complete elimination, is required, and without susceptibility to the problems cited above which arise largely as a consequence of the basically three-dimensional character of the flow field in which the rotor operates.

It is accordingly an object of the invention to provide a new and improved method of and apparatus for preventing entirely, or reducing the extent of, leading edge shock-waves and shock-related noise in transonic and supersonic rotor blades and the like that are not subject to the before-described limitations and disadvantages.

A further object is to provide a novel blade or similar apparatus of more general utility, as well.

Other and further objects will be explained hereinafter and are more particularly delineated in the appended claims.

In summary, from one of its broadest aspects, the invention contemplates a blade configuration in which the blade is shaped over the region thereof where the airflow relative to the blade is supersonic, with its leading edge swept, with respect to the direction of airflow at an acute angle less than $\sin^{-1} 1/M$, where M is the Mach number of the supersonic flow. Preferred details are hereinafter presented.

The invention will now be described with reference to the accompanying drawing,

FIGS. 1A, 1B and 1C of which are illustrative flow diagrams illustrating, respectively, the shock-free operation with a swept wing of infinite span when the normal component of airflow is subsonic, the generation of conical shock waves with a finite span swept wing with subsonic leading edges, and a shock-free leading edge of a finite span blade, appropriately provided with a Mach number skew gradient;

Figure 1A:
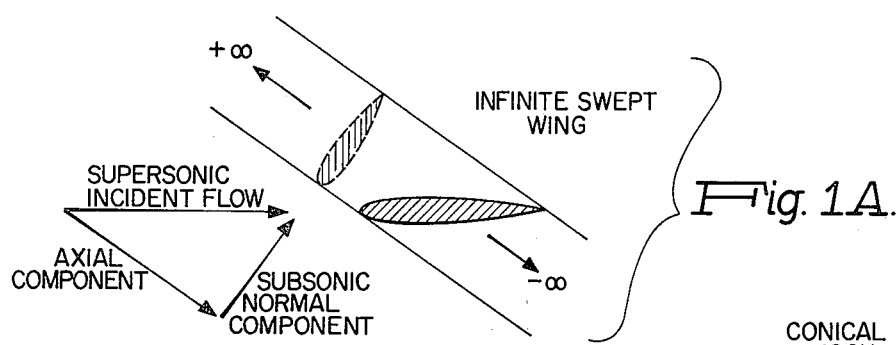

In FIG. 1A, a swept wing, blade or foil of infinite extent is illustrated, subject to an incident supersonic flow. Since there is no spanwise variation in the wing, blade or foil geometry, the axial flow component has no aerodynamic effect. This may be clearly understood by imagining an observer who moves along the wing span at the same speed as the axial flow component. This observer will see only the normal flow component passing over the wing, i.e. he sees simply flow over an unswept wing of infinite extent. Thus, the aerodynamic behavior is determined by the flow component that is normal to the structure's leading edge. If the normal flow component is subsonic there are no shock waves associated with the flow over this structure, though, of course, to be completely shockless, the normal component must be sufficiently subsonic that transonic flow effects do not occur in the normal flow plane; i.e. the normal flow component must not accelerate to sonic speed as it passes over the same. The only effect of the axial component is in the structure of the viscous boundary layer on the wing, blade or foil surface, but this is not related to the presence or absence of shock waves. The cross-sectional shape, sharpness, and alignment of the leading edge region are not important factors in the elimination of shock waves. The shock-free character of the flow derives from the effect of sweep (a three-dimensional effect) and not from the airfoil section properties. The same ideas to obtain shock-free flow are applicable, of course, to an infinite span sweptback cascade of airfoils, as well.

Figure 1B:
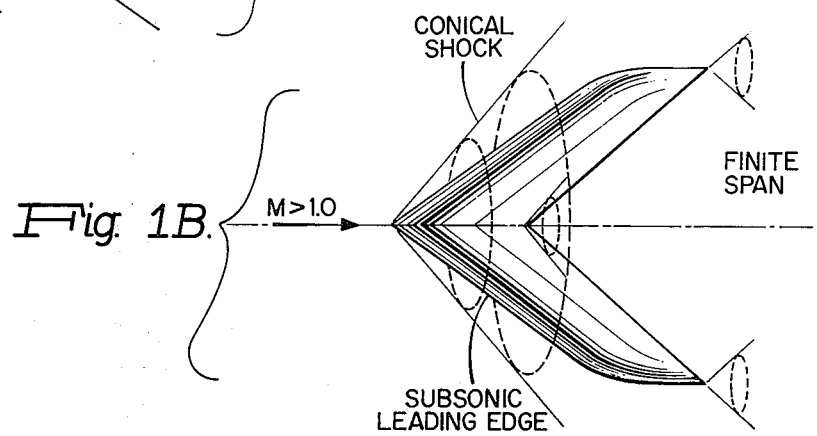

FIG. 1B, however, shows a finite span wing, blade or foil, swept-back to have "subsonic" leading edges; i.e. the normal component of flow to the leading edge is subsonic. The aerodynamics are now considerably more complicated. In particular, the presence of conical shocks, so-labelled, at the front and rear of the wing root and at the rear of the tips is unavoidable. These isolated points on the structure are discontinuities in the otherwise subsonic edges. The conical shocks are, however, weaker than their two-dimensional counterparts, and due to their three dimensional nature, decrease in strength with distance from their point of origin.

Figure 1C:
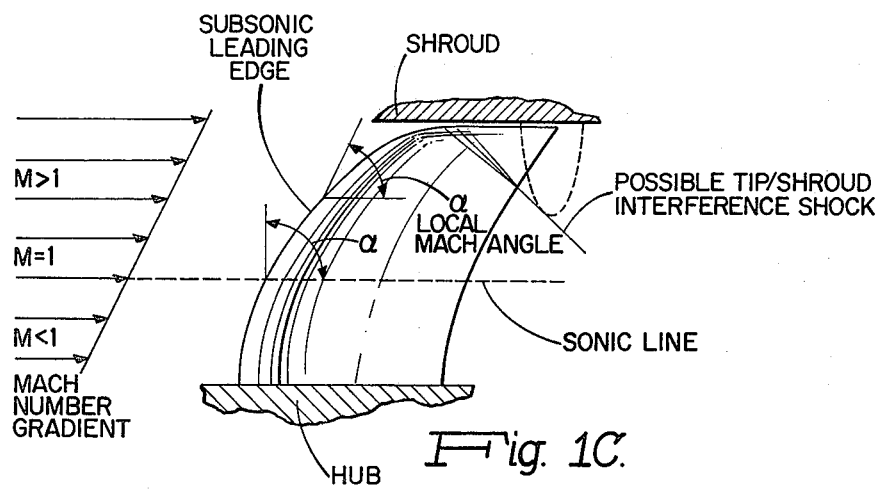

The application of a subsonic leading edge to a fan blade, is illustrated in FIG. 1C. This illustration is simplified to its essential form, showing only the radial change in Mach number. The actual process is nonplanar due to the change in direction of the inflow with radial location. The particular case illustrated applies to a transonic fan since part of the relative incident flow is subsonic. While the leading edge can be made completely shockless, even though the blade is of finite extent, there may, however, be a weak conical shock arising from interference between the shroud at the pressure field at the blade tip, later discussed. The local leading edge sweep at each radial station is chosen to be greater than the Mach angle of the local flow. In the real non-planar case, it must also be verified that this sweep is sufficient to keep the local leading edge behind the Mach lines from the contiguous segment of the upstream leading edge. This assures that the normal flow to the leading edge is everywhere subsonic. Because of the gradient in Mach number, the incident flow is subsonic at the base of the blade so a shock cannot emanate from this point (unlike the wing root in FIG. 1B). Hence the blade leading edge can be entirely shockless. If the relative inflow to the blade were completely supersonic, however, a conical shock would occur at the base of the blade. By designing the leading edge to be subsonic for the situation that produces maximum relative flow Mach number, the edge will remain subsonic under all other operating conditions.

While prior fan blades and other foils have, of course, been shaped in a myriad of ways for a variety of widely different applications and purposes as described, for example, in U.S. Pat. Nos. 2,212,041; 2,269,287; and 1,123,202; these, as will be evident from the above, have no real bearing upon the subsonic leading edge concept of the present invention or the problem underlying the same.

Figure 4:
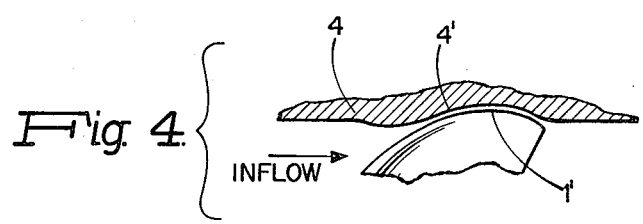
FIG. 4 is a fragmentary isometric view illustrating shaping of the shroud in accordance with the invention to be compatible with the natural streamline deflection due to sweep on the suction side of the blade.

The weak conical shock at the tip before referred to, is caused by several sources of aerodynamic interference between the blade tip and the shroud. Secondary flow through the small clearance region between the tip and the shroud is one contributor; another is the interaction of the blade with the shroud boundary layer and vice versa. These effects occur on all fan blades and are not unique to blades with subsonic leading edges. A swept blade, however, is subject to an additional effect because the sweep intoduces a small spanwise velocity component in the flow field. This spanwise component is suppressed at the rigid shroud wall leading to the production of a pressure wave which may coalesce away from the blade to form a weak conical shock. Fortunately, this effect can be largely cancelled by proper design of the blade tip and shroud wall contours in the region of interaction. Specifically, the shroud wall should be contoured to be compatible with the natural streamline deflection due to sweep on the suction side of the blade. Because the streamline deflection is different on the two sides of the blade, the shroud 4, FIG. 4, can be shaped as at 4' to be compatible with one side only. Since upstream shock waves come from the suction side, it is on this side that the aerodynamic interference effect should be relieved. The blade tip 1' should then be shaped to correspond with the shroud contour 4'. This is illustrated schematically in FIG. 4, such shroud contouring being also employable to help reduce the more conventional sources of aerodynamic interference found on blades in general.

In summary, therefore, the subsonic leading edge concept of the invention, when properly implemented, can prevent the formation of upstream propagating shockwaves from the leading edges and the forward parts of the suction surfaces of fan blades and the like operating in subsonic relative inflow. The remaining upstream conical shock waves which occur due to aerodynamic interference of the blade tips with the shroud, and which because of their three-dimensional character, are already weaker than the essentially two-dimensional shocks found on conventional blade designs and can be greatly reduced in strength by properly contouring the shroud wall.

Figure 2:
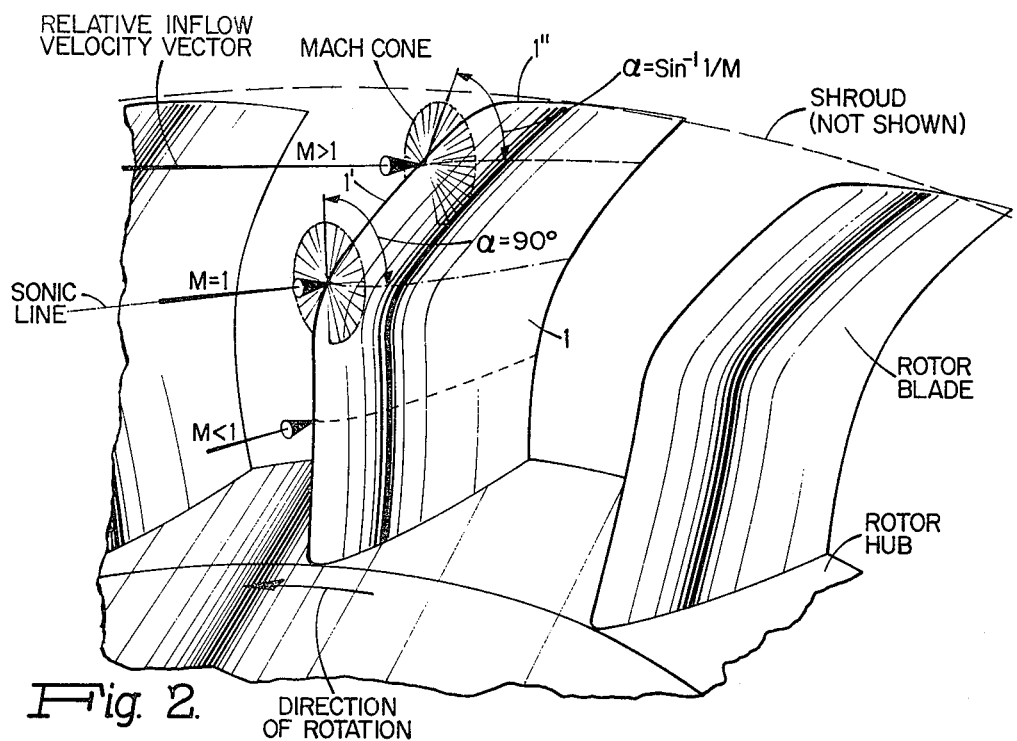
FIGS. 2 and 3 are partial isometric views of blades constructed in accordance with preferred embodiments of the invention employing the concept illustrated in FIG. 1C in skew swept-back and swept-forward constructions, respectively.
Figure 3:
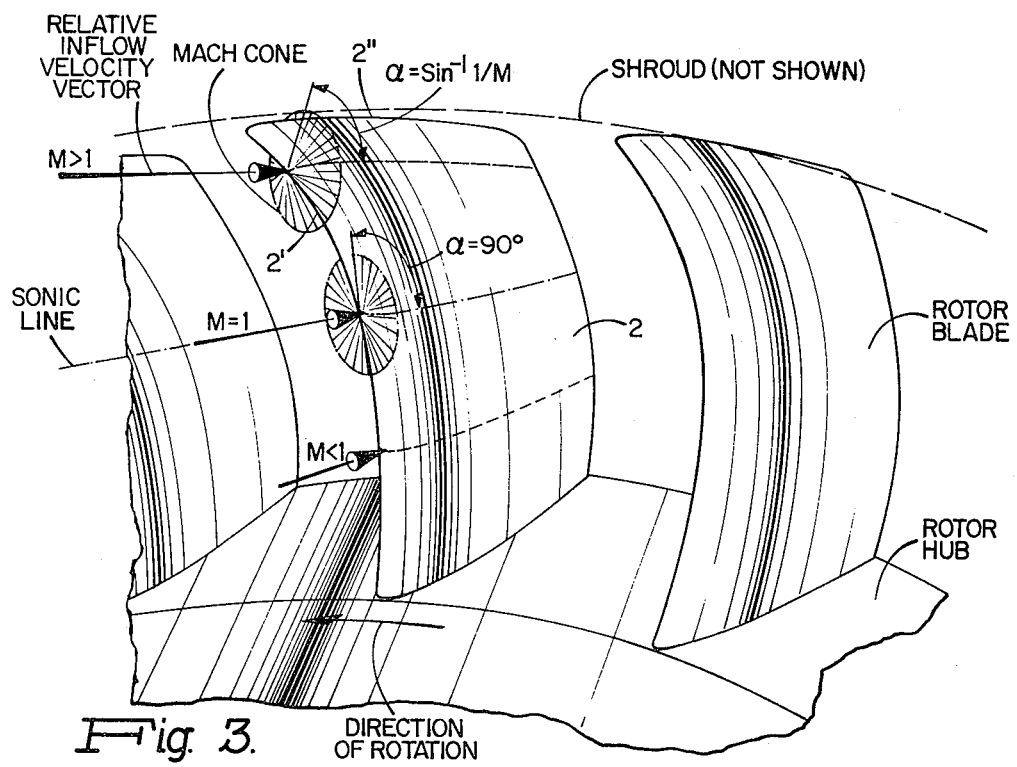

FIGS. 2 and 3 illustrate preferred embodiments of the invention showing the critical swept-forward and swept-backward constructions, respectively, of a plurality of circumferentially spaced similar parallel rotor fan blades adaptable to enable subsonic leading edge performance that prevents upstream shockwave and shock-related noise, the blades being rotated about an axis substantially parallel to the inflow direction. To achieve this, the blade leading edge in the intermediate region inward of the tip must be swept at an acute angle $\infty$ relative to the direction of the local inflow velocity vector less than the local Mach number angle of the flow (i.e. $< \sin^{-1} 1/m$) so that the velocity component normal to the blade edge (and aligned with the blade surface) is subsonic. The downstream portion of the edge must lie within the local Mach cone of the flow, with the degree by which the Mach angle exceeds the edge angle being sufficient to assure that even if the flow speed increases as it passes over the front portion of the blade, the normal component remains subsonic. Furthermore, the lines which generate the blade suction surface behind the leading edge must be similarly swept for some distance back. This distance must be sufficient to guarantee that any waves generated on the suction surface behind this point will be intercepted by the adjacent (following) blade. As an additional design refinement, the blade tip and shroud (if there is one) can be correspondingly countoured, as in FIG. 4, to reduce the aerodynamic interference due to sweep, of a swept blade, as previously described.

The actual implementation of the design may be accomplished in at least essentially two ways. First, a thin extension can be added to the supersonic portion of the leading edge of an existing blade design. This extension piece will provide a new leading edge of the proper shape. The extension can employ the features of backward and/or forward sweep, before mentioned. Alternatively, it might be applied to only that part of the supersonic portion of the leading edge which is deemed most important to render shock free. Since the extension is thin, it can be made to have little effect on the aerodynamics of existing blade designs. In this approach, the edge is meant to be passive except for its role in getting the flow into the blade row in a shock free manner.

Alternatively, and preferably, the required sweep can be integrated into the basic aerodynamic design of the blade. In its simplest form, this would merely constitute a refinement to the extension idea just discussed; essentially conventional aerodynamics would be employed. Taken further, the sweep would be incorporated into the basic blade aerodynamics. The swept leading edge skew region could perform a more active role in turning and compressing the flow rather than only providing shock-free entry into the blade row. Because the concept does not require the leading edge to be extremely sharp or the flow alignment to be especially precise, considerable design flexibility exists. Furthermore, the subsonic leading edge criterion is not especially restrictive; i.e. the leading edge curve is not uniquely defined. Thus, there is considerable freedom when stacking blade sections to minimize structural loads. To optimize aerodynamic performance, the blade twist distribution should be altered slightly to balance radial pressure gradients produced by sweep. A good design should use an edge shape which contains the shocks even in off-design operation. Also as before, depending on the design constraints and relative importance of effects, only part of the blade supersonic region may be swept, if desired.

Returning to FIGS. 2 and 3, the swept-back and swept-forward blades are desirable acoustically since no upstream shocks are generated anywhere along the leading edge region.

The blade 1 of FIG. 2 is shown with its intermediate region 1' extending to the tip 1", where supersonic inflow occurs in the direction of the arrow solabeled, swept-back at an angle $\alpha$ just less than about $\sin^{-1} 1/M$, where M is the Mach number associated with the Mach cone, also so-labelled and behind which the swept edge is maintained. Its direction of sweep, however, may encourage some radial flow as the fluid passes through the blade row, though this can be reduced or eliminated by design refinements. If the sweep-back construction requires a substantial rearward shift of blade section centers, large bending stresses may result. These stresses will be greatest at the trailing edge, which must be thin for aerodynamic reasons. The swept-back blade may thus be susceptible to structural constraints in some applications, if the region requiring sweep-skew is considerable.

The swept-forward intermediate region 2' to the tip 2" of the blade 2 of FIG. 3, however, may have favorable steady aerodynamic performance; perhaps an improvement over unswept blades in some respects (e.g. the suppression of radial flow tendencies). If the extent of sweep is considerable, then it may also be subject to very high bending and torsional stresses.

Which of these preferred embodiments is preferable for a particular type of fan stage depends strongly on the performance requirements and other design constraints. For blades with rather limited regions of supersonic flow, either of the swept-back or swept-forward designs is appropriate. The specific choice depends on the severity of structural constraints and the desire to implement a particular aerodynamic design.

Other configurations besides those of FIGS. 2 and 3 are of course possible, and any number of blade configurations with only part of the supersonic region swept can be conceived. While these involve an additional acoustic penalty, they may have aerodynamic or structural advantages that make them acceptable or even desirable for certain applications. As before explained, moreover, the principles of the invention are applicable to other blade, wing or foil structures than the particular illustrative rotor fans, all being "blades" in the sense herein employed.

Further modifications will also occur to others skilled in this art and are considered to fall within the spirit and scope of the invention as defined in the appended claims.

What is claimed is:

1. A rotor blade system for preventing transonic and supersonic air flow leading-edge shock and shock-related noise, said system having, in combination, rotor blade means oriented generally in the direction of air flow, means for circumferentially rotating the blade means about an axis substantially parallel to the said direction at a velocity sufficient to render the air flow relative to said blade means supersonic from a predetermined intermediate leading-edge region of the blade means to the tip edge thereof, said blade means being swept from said region to said tip edge at an acute angle with respect to said direction less than substantially $\sin^{-1} 1/M$, where M is the Mach number of the supersonic flow, and small enough to insure that the contour of the successive portions of the blade means over the region of supersonic flow lies inside the Mach cone of resultant flow velocity over the blade means thereat.

2. A rotor blade system as claimed in claim 1 and in which at least part of said intermediate region is swept forward.

3. A rotor blade system as claimed in claim 1 and in which at least part of said intermediate region is swept backward.

4. A rotor blade system as claimed in claim 1 and in which said blade means is dispersed within a surrounding shroud.

5. A rotor blade sytem as claimed in claim 4 and in which the contour of said surrounding shroud is in part shaped in the direction of said airflow to conform to the natural curvature of the streamlines on the blade suction surface as caused by the sweep of the said intermediate region near the said tip edge of the blade means.

6. A rotor blade system as claimed in claim 1 and in which the blade means comprises a plurality of circumferentially spaced substantially parallel blades each similarly intermediately swept at substantially said acute angle with a swept-forward contour.

7. A rotor blade system having, in combination, rotor blade means oriented generally in the direction of air flow and provided with a contour swept at an acute angle with respect to said direction near the tip edge thereof, whereby the streamlines on suction surfaces of the blade means are curved by the sweep of said blade means near said tip edge, and means for circumferentially rotating the blade means within a surrounding shroud about an axis substantially parallel to said direction, the contour of part of the shroud being shaped in the said direction to conform to the curvature of said streamlines near the tip edge.

8. A method of preventing leading-edge shock and shock-related noise in transonic and supersonic airflow over a blade and the like, that comprises, orienting the blade generally in the direction of airflow, rendering the airflow relative to the blade supersonic from a predetermined intermediate leading-edge region of the blade to the tip edge thereof, and sweeping the contour of said blade along at least part of the region of supersonic airflow at an acute angle to said direction less than substantially $\sin^{-1} 1/M$, where M is the Mach number of the supersonic flow, and small enough to insure that the contour of the successive portions of the blade over the region of supersonic flow lies inside the Mach cone of resultant flow velocity over the blade thereat.

9. A method as claimed in claim 8 and in which said sweeping step in effected forwardly along said direction.

10. A rotor blade system as claimed in claim 1 and in which the blade means comprises a plurality of circumferentially spaced substantially parallel blades each similarly intermediately swept at substantially said acute angle with a swept-backward contour.

11. A method as claimed in claim 8 and in which said sweeping step is effected rearwardly along said direction.

* * * * *